United States Patent [19]
Umebayashi et al.

[11] Patent Number: 5,355,270
[45] Date of Patent: Oct. 11, 1994

[54] MAGNETIC RECORDING MEDIUM HAVING A REFERENCE TRACK STRUCTURE FOR IMPROVED OPTICAL TRACKING

[75] Inventors: Nobuhiro Umebayashi, Tsukuba; Kazuya Fukunaga, Ibaraki, both of Japan

[73] Assignee: Hitachi Maxell, Ltd., Osaka, Japan

[21] Appl. No.: 910,563

[22] Filed: Jul. 8, 1992

[30] Foreign Application Priority Data

Jul. 10, 1991 [JP] Japan .................................. 3-195109
Jul. 26, 1991 [JP] Japan .................................. 3-208821

[51] Int. Cl.$^5$ .............................................. G11B 5/82
[52] U.S. Cl. ................................. 360/135; 360/133
[58] Field of Search ............................ 360/135, 133

[56] References Cited

U.S. PATENT DOCUMENTS

| | | | |
|---|---|---|---|
| 4,861,656 | 8/1989 | Uchiyama et al. | 360/135 X |
| 4,879,691 | 11/1989 | Suzuki | 365/215 |
| 4,961,123 | 10/1990 | Williams et al. | |
| 5,210,672 | 5/1993 | Ivers et al. | 360/133 X |

*Primary Examiner*—John H. Wolff
*Attorney, Agent, or Firm*—Birch, Stewart, Kolasch & Birch

[57] ABSTRACT

A magnetic recording medium in which the center of a magnetic head can be brought to a centerline of a reference track, thereby enhancing the reliability of the magnetic recording medium, the reference track being provided at a predetermined position of a magnetic layer of the medium, a number of magnetic head-tracking optical tracks are provided respectively at positions spaced predetermined distances from the reference track in a direction perpendicular to the direction of travel of the magnetic head, and a data track is formed between any two adjacent ones of the magnetic head-tracking optical tracks, the reference track having a pair of reference recess regions arranged symmetrically with respect to an arbitrary point on the centerline of the reference track, and a flat portion with no recess formed adjacent to each of the reference recess regions, the recess in each reference recess region being formed by cutting by a laser.

14 Claims, 17 Drawing Sheets (I)

(II)

(III)

(I)

(II)

(III)

MAGNETIC RECORDING MEDIUM HAVING A REFERENCE TRACK STRUCTURE FOR IMPROVED OPTICAL TRACKING

BACKGROUND OF THE INVENTION

1. Field of the Invention

This invention relates to a magnetic recording medium such as a flexible magnetic disk, and more particularly to a magnetic recording medium enabling an optical tracking.

2. Discussion of Related Art

There is known a flexible magnetic disk, for example, from U.S. Pat. No. 4,961,123, in which a reference track is formed at an innermost peripheral portion of a doughnut-like recording region of the disk, and a number of magnetic head-tracking optical recesses of a ring-shape are formed radially outwardly of the reference track at predetermined intervals in concentric relation to the reference track, and the region between any two adjacent rings of magnetic head-tracking optical recesses serves as a data track.

A predetermined signal is beforehand recorded in the above reference track of this magnetic disk. When desired information is to be recorded on this magnetic disk, or when the recorded information is to be reproduced therefrom, the signal in the reference track disposed at the innermost peripheral portion of the recording region are first read by a magnetic head to find a reference position of the magnetic head on the magnetic disk. Then, the magnetic head is shifted a predetermined distance or pitch radially outwardly, and the magnetic head-tracking optical recesses are scanned by optical means, comprising a light-emitting element and a light-receiving element, to effect a tracking servo of the data tracks so as to record or reproduce the information.

FIGS. 18 and 19 are an enlarged plan view and an enlarged cross-sectional view of a part of a conventional reference track, respectively. As shown in FIG. 18, the reference track 100 extends along a direction X of travel of a magnetic head, and a pair of rectangular reference recesses 103A and 103B are provided symmetrically with respect to an arbitrary point 102 on a centerline 101 of the reference track 100. A flat portion 104A with no recess is provided adjacent to the reference recess 103A (that is, forwardly of the reference recess 103B), and also a flat portion 104B with no recess is provided adjacent to the reference recess 103B (that is, rearwardly of the reference recess 103A). A number of pairs of such reference recesses 103A and 103B and a number of pairs of such flat portions 104A and 104B are provided at intervals along the direction X of travel of the magnetic head to thereby form the reference track 100.

As shown in FIG. 19, the reference recesses 103A and 103B are formed by pressing a die against a surface of a magnetic layer 105 to compress it.

Predetermined signals are recorded on the reference track 100 over the entire area thereof, wherein the recorded signals correspond not to the reference recesses 103A and 103B which are depressed, but to the flat portions 104A and 104B which are not depressed. In accordance with the signal waveform obtained by scanning the reference track 100 by the magnetic head, a feedback control is applied to the present position of the magnetic head, so that the magnetic head can be brought to the centerline 101 (reference position) of the reference track 100.

After the magnetic head is thus located at the reference position on the magnetic disk, the magnetic head is radially outwardly shifted a predetermined distance from this reference position to a desired one of the data tracks.

As shown in FIGS. 18 and 19, each of the conventional reference recesses 103A and 103B is depressed continuously over the entire length thereof, and therefore has a relatively large area. On the other hand, the magnetic layer 105 contains, in addition to magnetic powder, materials such as a binder, an abrasive material, a filler and a lubricant and has a certain degree of elasticity.

Therefore, when the reference recesses 103A and 103B are formed by pressing by means of the die, a central portion 106 of the reference recess 103A (103B) is made to bulge because of a spring back effect due to the elasticity, as indicated by a dot-and-dash line in FIG. 19, so that the recess fails to be a complete recess. This tendency is conspicuous particularly when the length of the reference recess 103A (103B) becomes greater in the direction X of travel of the magnetic head.

Since the reference recesses 103A and 103B are formed by compression, a thin layer 107, which becomes higher in density in the filling of the magnetic powder than the other portions, is formed underneath a bottom surface of the reference recess 103A (103B).

Therefore, when signals are to be recorded on the reference track 100, undesired signals are likely to be recorded also on the central portions of the reference recesses 103A and 103B, and therefore the center of the magnetic head can not be brought properly to the centerline 101 of the reference track 100, which results in a problem with respect to the reliability.

SUMMARY OF THE INVENTION

It is an object of this invention to provide a magnetic recording medium which overcomes the above problems of the prior art, and is highly reliable, so that a center of a magnetic head can be brought properly to a centerline of a reference track.

According to a first aspect of the present invention, there is provided a magnetic recording medium comprising a substrate made of a non-magnetic material, and a magnetic layer formed on the substrate, wherein the magnetic layer comprises a reference portion at a predetermined position thereof;

a first magnetic head-tracking optical recess at a position spaced a predetermined distance from the reference portion in a direction perpendicular to a direction of travel of a magnetic head relative thereto;

a second magnetic head-tracking optical recess at a position spaced a predetermined distance from the first magnetic head-tracking optical recess in a direction perpendicular to the direction of travel of the magnetic head; and a first data track for recording therein desired information between the first and second magnetic head-tracking optical recesses, wherein the reference portion has a pair of reference recess regions arranged symmetrically with respect to an arbitrary point on a centerline of the reference portion, each reference recess region comprising a portion formed by cutting by a laser beam, and a flat portion with no recess which flat portion is disposed adjacent to each of the reference recess regions.

The reference recess regions may be disposed accurately symmetrically with respect to the arbitrary point on the centerline; however, usually, since the reference portion has a shape of an arc, the reference recess regions become slightly deviated from their accurately symmetrical positions. In the present invention, these conditions are collectively referred to as "symmetrical with respect to a point".

In the present invention, as described above, the reference recess is formed by cutting by a laser, so that the magnetic powder and binder are eliminated from that portion where the reference recess is formed. Therefore, in contrast with the prior art, spring back will not occur, and the density of the content of the magnetic powder will not become higher at that portion of the magnetic layer remaining where the reference recess is formed, so that neat recesses are formed.

Therefore, undesired signals are not recorded on the reference recess, and the center of the magnetic head can be brought properly to the centerline of the reference track, thereby enhancing the reliability.

According to a second aspect of the invention, there is provided a magnetic recording medium comprising a substrate made of a non-magnetic material, and a magnetic layer formed on the substrate, wherein the magnetic layer comprises a reference portion at a predetermined position thereof;

a first magnetic head-tracking optical recess at a position spaced a predetermined distance from the reference portion in a direction perpendicular to a direction of travel of a magnetic head relative thereto;

a second magnetic head-tracking optical recess at a position spaced a predetermined distance from the first magnetic head-tracking optical recess in a direction perpendicular to the direction of travel of the magnetic head; and a first data track for recording therein desired information between the first and second magnetic head-tracking optical recesses, wherein the reference portion has at least one pair of reference recess regions arranged symmetrically with respect to an arbitrary point on a centerline of the reference portion, each of the reference recess regions having small recesses and small flat portions alternately, and a flat portion with no recess which flat portion is disposed adjacent to each of the reference recess regions.

As described above, in the present invention, the small recesses and the small flat portions are alternately formed on the reference recess region, and therefore even if the recesses are formed by pressing, the influence by a spring back is hardly noticeable, and the neat recess can be formed.

Therefore, undesired signals are not recorded on the reference recess region, and the center of the magnetic head can be brought properly to the centerline of the reference track, thereby enhancing the reliability.

DETAILED DESCRIPTION OF THE INVENTION

A preferred embodiment of the present invention will now be described with reference to the drawings.

Figure 1:
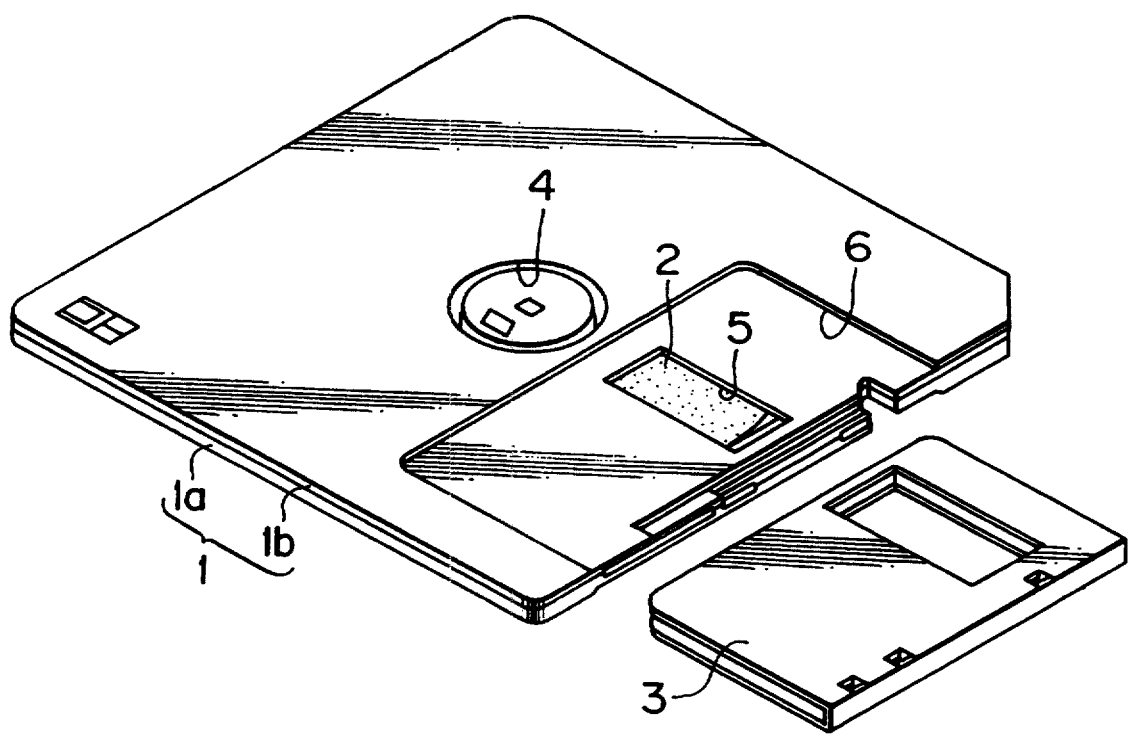
FIG. 1 is a perspective view of a magnetic disk cartridge according to an embodiment of the present invention, with a portion thereof disassembled.

As shown in FIG. 1, a magnetic disk cartridge comprises a cartridge case 1, a flexible magnetic disk 2 rotatably housed in the cartridge case 1, and a shutter 3 to be slidably mounted on the cartridge case 1, with a cleaning sheet (not shown) fused to the inner surface of the cartridge case 1.

The cartridge case 1 is composed of an upper case 1a and a lower case 1b, and these cases 1a, 1b are injection-molded, for example, of a rigid synthetic resin, such as an ABS resin.

A rotation drive shaft-insertion hole 4 is formed through a generally central portion of the lower case 1b, and a head insertion hole 5 of a rectangular shape is also formed through a portion of the lower case 1b situated near the hole 4. Although not shown in the drawings, another head insertion hole 5 is similarly formed through the upper case 1a.

Each of the upper and lower cases 1a and 1b is slightly recessed adjacent to its front side to provide a depression 6. Edges of these depressions 6 serve to limit the sliding movement of the shutter 3. The head insertion hole 5 is formed in the generally central portion of the recess 6.

Figure 3:
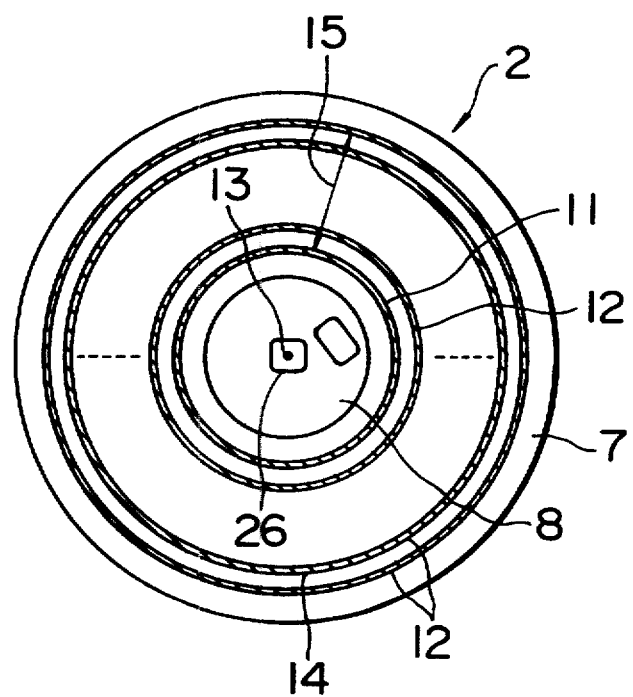
FIG. 3 is a plan view of a magnetic disk.

As shown in FIG. 3, the magnetic disk 2 comprises the doughnut-like or annular flexible magnetic sheet 7, and a center hub 8 of metal or a synthetic resin inserted in and bonded to a center hole of the magnetic sheet 7.

Figure 2:
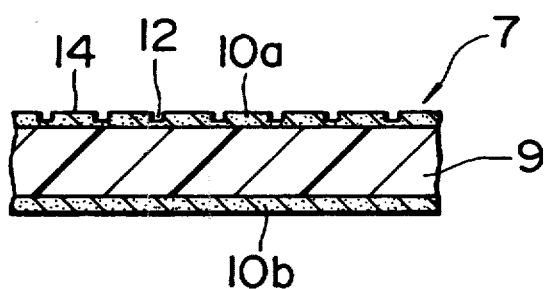
FIG. 2 is an enlarged cross-sectional view of a magnetic sheet.

The magnetic sheet 7 comprises a base film 9, and magnetic layers 10a and 10b coated respectively on the opposite sides or faces of the base film 9 (see FIG. 2).

The base film 9 is composed, for example, of a synthetic resin film such as polyethylene terephthalate (PET), polyethylene naphthalate (PEN) and a polyimide.

Each of the magnetic layers 10a and 10b is composed of a mixture of ferromagnetic powder, a binder, abrasive powder, a lubricant and etc.

Examples of the ferromagnetic powder include α-Fe, barium ferrite, Co—Ni, Co—P, γ-Fe2O3, Fe3O4, Co-containing γ-Fe2O3, Co-containing γ-Fe3O4, CrO2, Co, and Fe—Ni.

Examples of the binder include a vinyl chloride-vinyl acetate copolymer, a vinyl chloride-vinyl acetate-vinyl alcohol copolymer, a urethane resin, a polyisocyanate compound, and a radiation-curing resin.

Examples of the abrasive powder include aluminum oxide, chromium oxide, silicon carbide and silicon nitride. Preferably, the percentage of addition of the abrasive powder is about 0.1 wt. % to about 25 wt. % relative to the magnetic powder.

Examples of the lubricant include higher fatty acid such as stearic acid and oleic acid, higher fatty ester thereof, liquid paraffin, squalane, a fluoroplastics, and fluorine oil. Preferably, the percentage of addition of the lubricant is about 0.1 wt. % to about 25 wt. % relative to the magnetic powder.

Specific examples of the magnetic coating composition are given in the following:

Example 1 of Magnetic Coating Composition

| | |
|---|---|
| α-Fe | 100 parts by weight |
| (Hc: 16500[Oe], Saturation magnetization: 135[emu/g], average major axis diameter: 0.25 [μm], average aspect ratio: 8) | |
| Vinyl chloride-vinyl acetate-vinyl alcohol copolymer | 14.1 parts by weight |
| Urethane resin | 8.5 parts by weight |
| Trifunctional isocyanate compound | 5.6 parts by weight |
| Aluminum oxide powder | 20 parts by weight |
| (Average particle size: 0.43 [μm]) | |
| Carbon black | 2 parts by weight |
| Oleyl oleate | 7 parts by weight |
| Cyclohexane | 150 parts by weight |
| Toluene | 150 parts by weight |

Example 2 of Magnetic Coating Composition

| | |
|---|---|
| Barium ferrite | 100 parts by weight |
| (Hc: 530[Oe], Saturation magnetization: 57[emu/g], average particle size: 0.04 [μm]) | |
| Vinyl chloride-vinyl acetate-vinyl alcohol copolymer | 11.0 parts by weight |
| Urethane resin | 6.6 parts by weight |
| Trifunctional isocyanate compound | 4.4 parts by weight |
| Aluminum oxide powder | 15 parts by weight |
| (Average particle size: 0.43 [μm]) | |
| Carbon black | 2 parts by weight |
| Oleyl oleate | 7 parts by weight |
| Cyclohexanone | 150 parts by weight |
| Toluene | 150 parts by weight |

The magnetic coating composition of each of the above Example 1 or Example 2 is sufficiently mixed together and dispersed in a ball mill to prepare the magnetic coating material. This magnetic coating material is coated onto both sides of a base film of polyethylene terephthalate (PET) having a thickness of 62 μm, in such an amount that each coated layer, when dried, has a thickness of 0.7 μm. Then, the coated layers are dried, and are subjected to calendering to form the magnetic layers 10a and 10b, respectively.

A reference track 11 and a number of magnetic head-tracking optical tracks 12 shown in FIG. 3 are formed on a surface of the magnetic layer 10a of the thus formed magnetic disk 2. The reference track 11 and the magnetic head-tracking optical tracks 12 are arranged in concentric circles having their con, non center on an axis 13 of rotation of the magnetic disk 2.

A data track 14 for recording desired information is formed between every two adjacent magnetic head-tracking optical tracks 12.

As shown in FIG. 3, the reference track 11 is formed at the innermost peripheral portion of a recording region 15 provided on the magnetic disk 2, and a number of magnetic head-tracking optical tracks 12 and a number of data tracks 14 are alternately formed radially outwardly of the reference track 11, that is, radially outwardly in a direction perpendicular to the direction of travel of the magnetic head.

Figure 4:
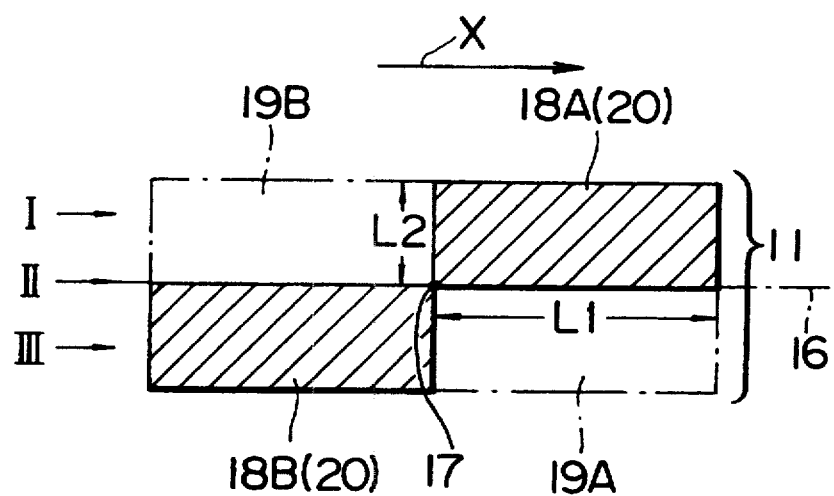
FIG. 4 is an enlarged plan view of a portion of a reference track.

As shown in FIG. 4, the reference track 11 extends along the direction X of travel of the magnetic head, and a pair of rectangular reference recess regions 18A and 18B are formed symmetrically with respect to an arbitrary point 17 on a centerline 16 of the reference track 11. A flat portion 19A with no recess is provided adjacent to the reference recess region 18A (that is, forwardly of the reference recess region 18B), and also a flat portion 19B with no recess is provided adjacent to the reference recess region 18B (that is, rearwardly of the reference recess region 18A).

A number of pairs of such reference recess regions 18A and 18B and a number of pairs of such flat portions 19A and 19B are provided at intervals or continuously in the direction X of travel of the magnetic head to thereby form the reference track 11.

In this embodiment, the circumference of the reference track 11 is equally divided into 28 sections, and 14 sets of reference detection portions are formed at equal intervals, where one set of reference detection portions comprises one pair of reference recess regions 18A, 18B and one pair of flat portions 19A, 19B.

Although the reference position of the magnetic head can be determined by providing at least one set of reference detection portions, it takes much time to determine the reference position with such an arrangement. Therefore, by providing many sets of reference detection portions as in this embodiment, the positioning of the magnetic head can be effected in a shorter time.

Figure 5:
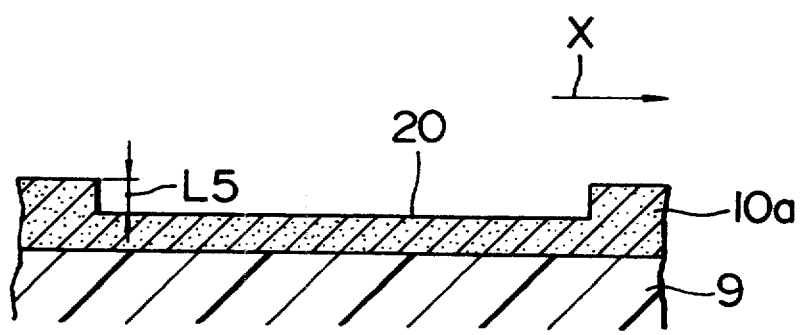
FIG. 5 is an enlarged cross-sectional view of a portion of the reference track.

A recess 20 of a constant depth is formed in the reference recess region 18A (18B) over the entire area thereof. The recess 20 is formed by cutting substance of the magnetic layer 10a in the recess region 18A (18B) by a laser. More specifically, a laser beam is applied in a spot-like manner to the magnetic layer 10a, and this laser beam is scanned in a predetermined direction to melt and evaporate the magnetic powder, the binder and etc., on this beam-applied portion, to eliminate these substances, thereby forming the recess 20 with a predetermined depth and a predetermined length. Therefore, as shown in FIG. 5, the cross-sectional shape of the recess 20 is accurately rectangular.

Since the recess 20 is formed by such a cutting operation, the density of the magnetic powder filler underneath the recess 20 is the same as that of the other portions of the magnetic layer, and besides the magnetic layer 10a is reduced in thickness at those portions thereof where the recesses 20 are provided. Therefore, the decrease of the output due to the high density of the magnetic powder filler in the magnetic layer which reduces the difference in the amplitude of the output signal between the recess and the flat portion, as caused by the conventional stamping method, is restrained, so that the difference in the output signal between the recess and the flat portion 19 is kept large. This is desirable. Particularly when the recess 20 is cut to a depth corresponding to the entire thickness of the magnetic layer 10a, this is more preferable.

In this embodiment, a length L1 of the reference recess region 18A (18B) in the direction of travel of the magnetic head is 2.4 mm, a length L2 in its widthwise direction is 18 $\mu$m, and a depth L5 (FIG. 5) of the recess 20 is 0.3 to 0.4 $\mu$m.

The lengths and depth of these portions are suitably determined in accordance with the properties of the magnetic layer 10, the wavelength of the signal to be recorded on the reference track 11, and etc.

The recess 20 is formed, for example, by a ruby laser (laser beam wavelength: 0.69 $\mu$m; oscillation type: pulse type), a YAG laser (laser beam wavelength: 1.07 $\mu$m; oscillation type: pulse type or continuous type), a glass laser (laser beam wavelength: 1.07 $\mu$m; oscillation type: pulse type or continuous type), or a carbon dioxide gas laser (laser beam wavelength: 10.63 $\mu$m; oscillation type: continuous type).

Figure 6:
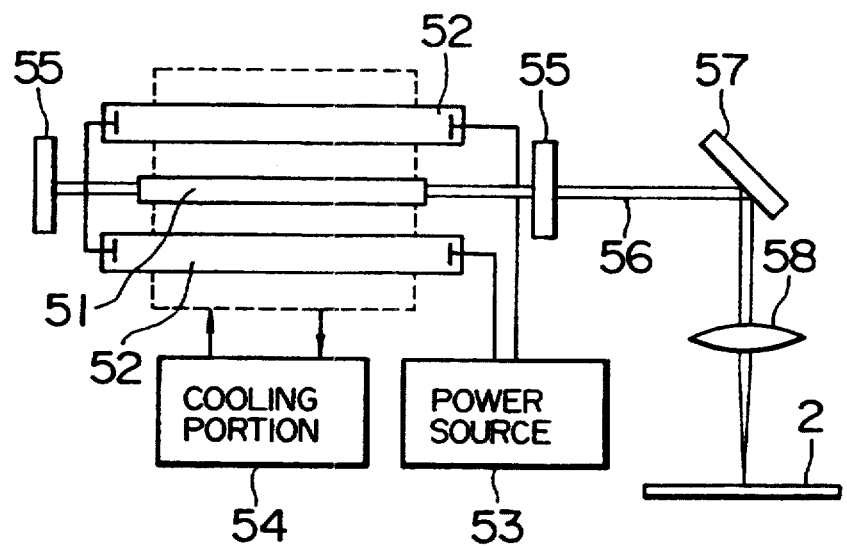
FIG. 6 is a schematic illustration of a construction of a YAG laser beam-generating device.

FIG. 6 is a schematic illustration of a construction of a laser beam-generating device for forming the recess 20 using a YAG laser. In FIG. 6, there is seen a YAG rod 51, a flash lamp 55, a power source 53, a cooling portion 54, a half mirror 55, a laser beam 56, a dichroic mirror 57, and a condenser or focusing lens 58.

Using this laser beam-generating device, the recesses 20 having the above-mentioned length and depth are formed in the predetermined portions (the reference recess regions 18A and 18B) of the magnetic disk 2.

The predetermined signals are recorded over the entire area of the reference track 11 (over the combined widths of the reference recess region 18A and the flat portion 19A); however, since the recesses 20 are depressed, the signal is not recorded at or by the recesses 20, but is recorded at or by the flat portions 19A and 19B. In response to the signal waveform obtained by scanning the reference track 11 by the magnetic head whose track width is a half of the track width of the reference track 11, a feedback control is applied to the present position of the magnetic head so as to bring the center position of the magnetic head (the magnetic gap) to the centerline 16 of the reference track 11.

Figure 7:
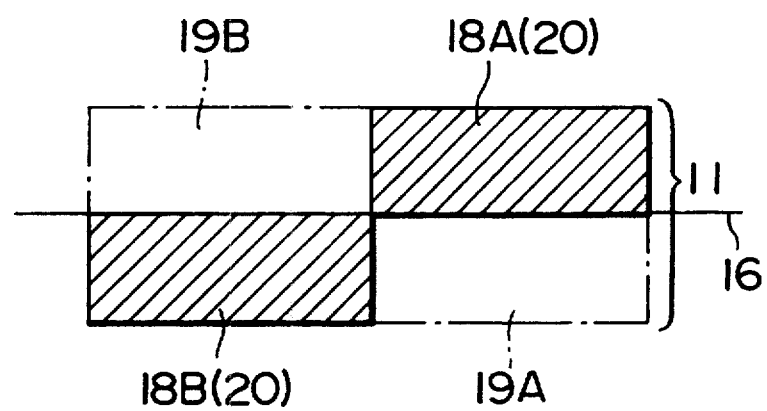
FIG. 7 is a diagrammatic illustration showing the reference track and associated output waveforms of signals to be read from the reference track.
Figure 7:
Figure 7:
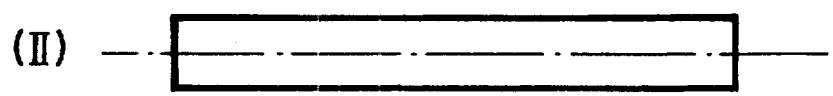
Figure 7:
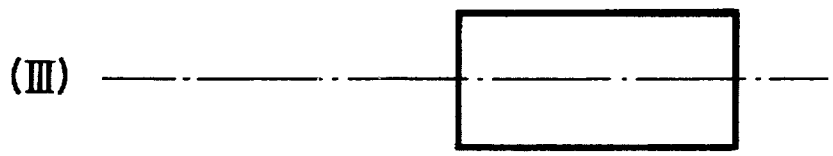

Output waveforms, obtained when the magnetic head is scanningly moved at position I, position II and position III in a direction of arrow in FIG. 4, are shown respectively in (I), (II) and (III) of FIG. 7, which also shows, on top thereof, the reference track 11. The output waveforms in FIG. 7 are envelope waveforms of a high-frequency reproduction output.

Diagram (I) of FIG. 7 shows the output waveform obtained when the magnetic head is scanningly moved at the position I in FIG. 4. This shows that the magnetic head passes past the boundary between the flat portion 19B and the reference recess region 18A when the output is changed from a high level to zero to give a rectangular envelope of waveform.

Diagram (II) of FIG. 7 shows the output waveform obtained when the magnetic head is scanningly moved at the position II in FIG. 4, that is, over the centerline 16 of the reference track 11. This output waveform is lower and longer (or continuous) than the output waveform of the above diagram (I).

Diagram (III) of FIG. 7 shows the output waveform obtained when the magnetic head is scanningly moved at the position III in FIG. 4. This shows that the magnetic head passes past the boundary between the reference recess region 18B and the flat portion 19A when the output is changed from zero to a high level to give a rectangular envelope of waveform.

Thus, the waveform greatly varies in shape when the position of the magnetic head in the widthwise direction of the reference track is changed. By adjusting the position of the magnetic head so that the output waveform as in diagram (II) of FIG. 7 can be obtained, the center position of the magnetic head (the magnetic head) can be brought to the centerline 16 of the reference track 11.

Thus, the center position of the magnetic head is brought into registry with the centerline 16 of the reference track 11 (that is, the reference position), and by the use of an optical position detector or photo-detector 36 (later described) comprising a light-emitting element 31 and a group of light-receiving elements 32 which are mounted on the magnetic head, the position of the photodetector 36 between two magnetic head-tracking optical tracks 12 on the magnetic disk 2 is detected. Then, the amount of positional deviation of the photodetector 36 from the optical tracks 12 is calculated, and the tracking servo of the magnetic head is effected in accordance with this deviation amount.

Namely, a motor (not shown) for transferring a magnetic head carriage is rotated to move the center position of the magnetic head (the magnetic gap) to a position near to a centerline 24 (FIG. 8) of the first data track.

Then, the tracking servo of the magnetic head is effected utilizing the magnetic head-tracking optical tracks 12.

Figure 8:
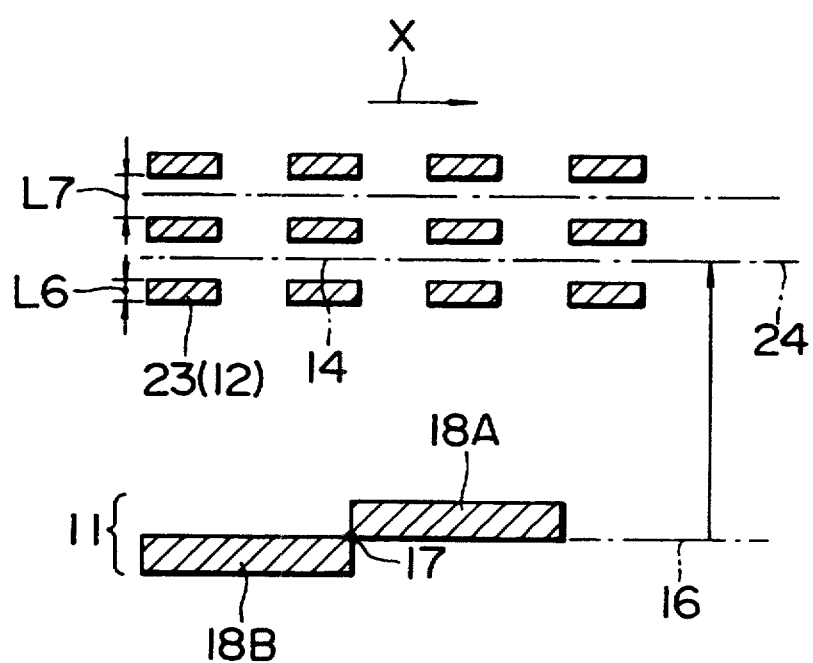
FIG. 8 is a view explanatory of the reference track and magnetic head-tracking optical tracks.

As shown in FIG. 8, also, tracking recesses 23 are formed at intervals or continuously in (or to define) the magnetic head-tracking optical track 12 along the direction X of travel of the magnetic head.

In this embodiment, the width L6 of the magnetic head-tracking optical track 12 (the tracking recess 23) is 5 μm, and the width L7 of the data track 14 is 15 μm.

Next, the tracking servo will now be described with reference to FIGS. 9 to 12.

Figure 9:
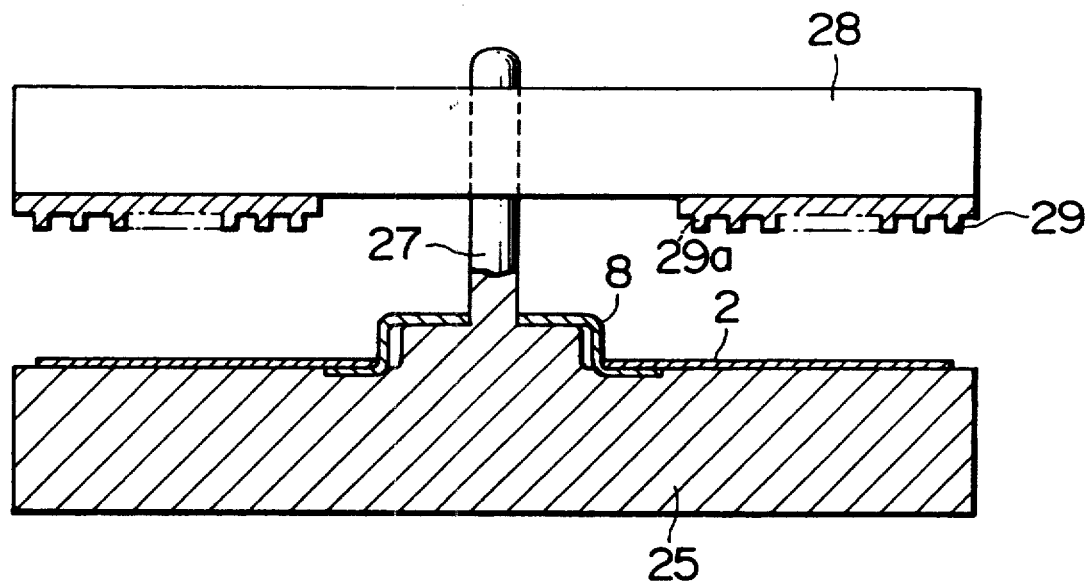
FIG. 9 is a cross-sectional view of an example of a device for forming the magnetic head-tracking optical tracks.

The tracking recesses 23 of the magnetic head-tracking optical tracks 12 are simultaneously formed by pressing, as shown in FIG. 9.

As shown in FIG. 9, the magnetic disk 2 having the center hub 8 is set on a base 25 of an embossing press machine. The base 25 has a center pin 27 projected therefrom which pin 27 is to be inserted into a center hole 26 (FIG. 3) of the center hub 8. When the magnetic disk 2 is placed on the base 25 with the center pin 27 passed through the center hole 26 of the center hub 8, the magnetic disk 2 is positioned on the base 25.

A stamper 28 is mounted above the base 25 in parallel relation thereto so as to move upward and downward. The upward and downward movement of the stamper 28 is guided by the center pin 27. Fine projections 29 for forming the tracking recesses 23 are formed on the stamper 28.

The stamper 28 is moved downward from the position shown in FIG. 9, so that the magnetic sheet 7 of the magnetic disk 2 is held between the base 25 and the stamper 28 under a predetermined pressure. Thus, the projections 29 on the stamper 28 bite into the surface of the magnetic layer 10, so that the tracking recesses 23 of a generally trapezoidal cross-section are formed at a time by compression.

Figure 10:
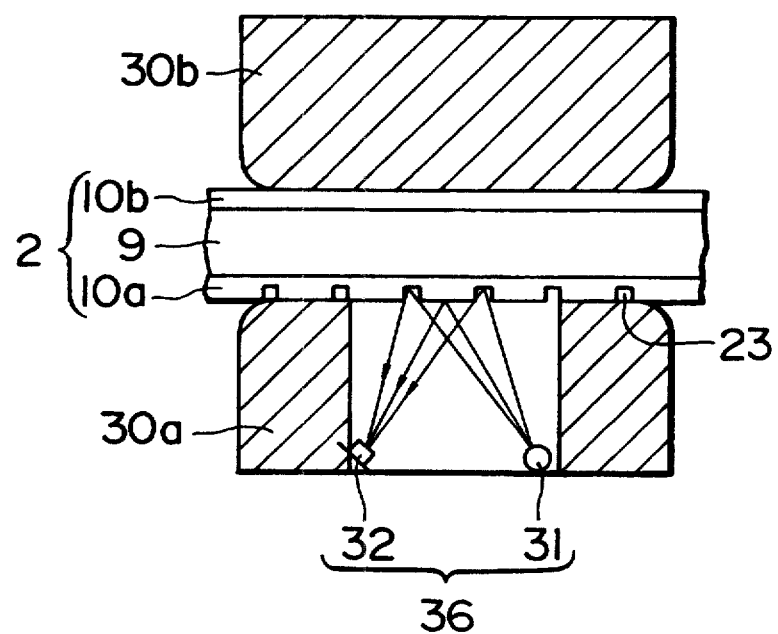
FIG. 10 is a cross-sectional view explanatory of an example of a tracking servo of a magnetic head.
Figure 12:
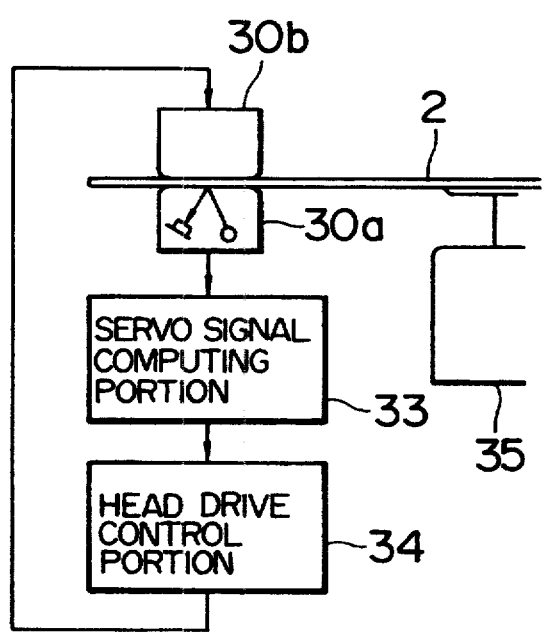
FIG. 12 is a block diagram explanatory of an example of a tracking servo of the magnetic head.

FIGS. 10 and 12 are views for explaining the tracking servo of the magnetic disk 2. As shown in these Figures, the magnetic disk 2 is held between magnetic heads 30a and 30b, and the light-emitting element 31 (e.g. LED) for emitting a light beam, to the magnetic layer 10a, for the tracking servo, as well as a group of light-receiving elements 32 for receiving reflected light from the magnetic layer 10a, are mounted integrally on the magnetic head 30a.

As shown in FIG. 10, that portion of the magnetic head 30a where the light-emitting element 31 and the group of light-receiving elements 32 are mounted is open toward the magnetic disk 2.

Figure 11:
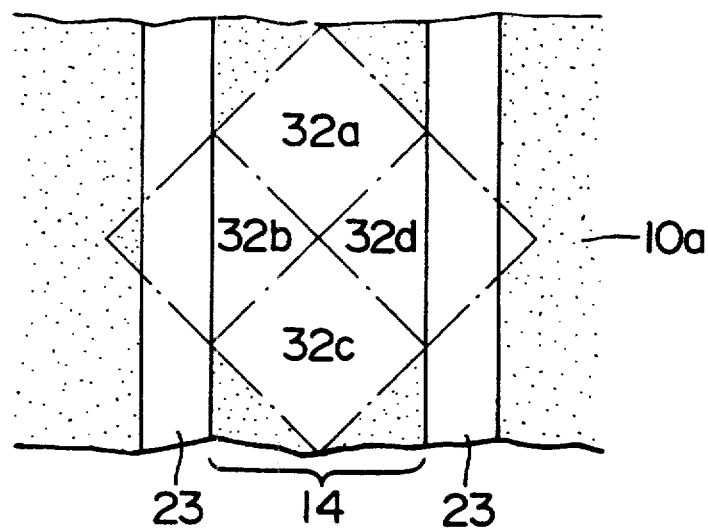
FIG. 11 is a view showing an example of an arrangement of light-receiving elements.

As shown in FIG. 11, the light-receiving element group 32 consists, for example, of four light-receiving elements 32a, 32b, 32c and 32d. The light reflected by the data track 14 and the tracking recesses 23 are received by these light-receiving elements 32a to 32d, and the output of each of the light-receiving elements 32a to 32d is given to a servo signal computing portion 33, as shown in FIG. 12. A position correction signal obtained at this servo signal computing portion 33 is given to a head drive control portion 34, and the tracking control of the magnetic head 30 is effected in accordance with a control signal from the head drive control portion 34.

Figure 13:
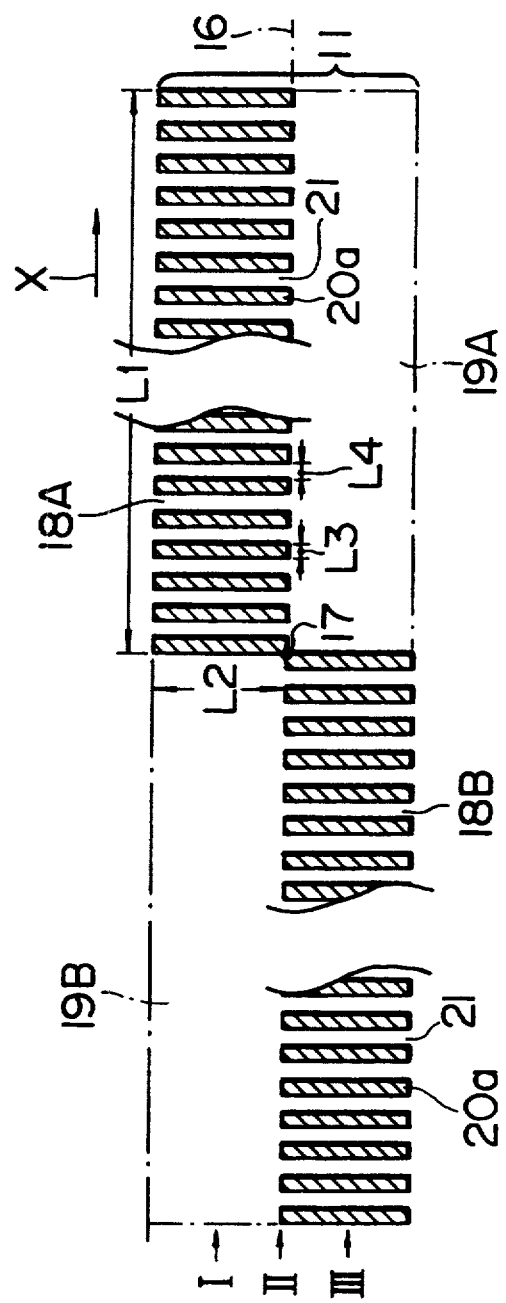
FIG. 13 is an enlarged plan view of a modified reference track.

FIG. 13 shows a modified reference track. A number of small or fine recesses 20a and a number of small or fine flat portions 21 (both of which extend perpendicularly to the direction X of travel of the magnetic head) are alternately formed on each of reference recess regions 18A and 18B.

In one of preferred examples, the length L1 of the reference recess region 18A (18B) in the direction of travel of the magnetic head is 2.4 mm, and the length L2 in its widthwise direction is 18 μm, and the length L3 of the small recess 20a in the direction of travel of the magnetic head is 5 μm, and the length L4 of the small flat portion 21 in the direction of travel of the magnetic head is 5 μm, and the depth L5 of the small recess 20a is 0.3 to 0.4 μm.

Figure 14:
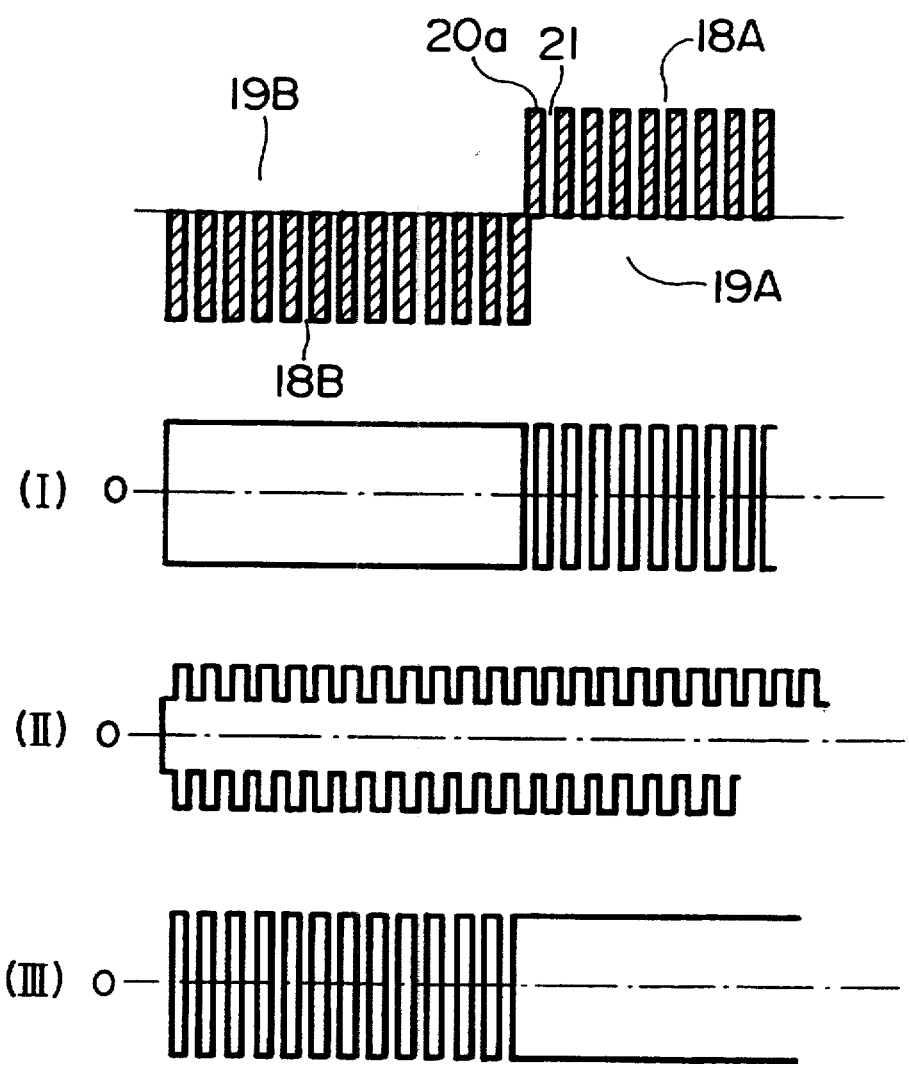
FIG. 14 is a diagrammatic illustration showing the modified reference track and associated output waveforms of signals to be read from the reference track.

Output waveforms, obtained when the magnetic head is scanningly moved at position I, position II and position III in a direction of arrow in FIG. 13, are shown in FIG. 14, which also shows the reference track 11 on its top.

In this embodiment, the position of the magnetic head is adjusted so that the output waveform (envelope) as shown in diagram (II) of FIG. 14 can be obtained.

Figure 15:
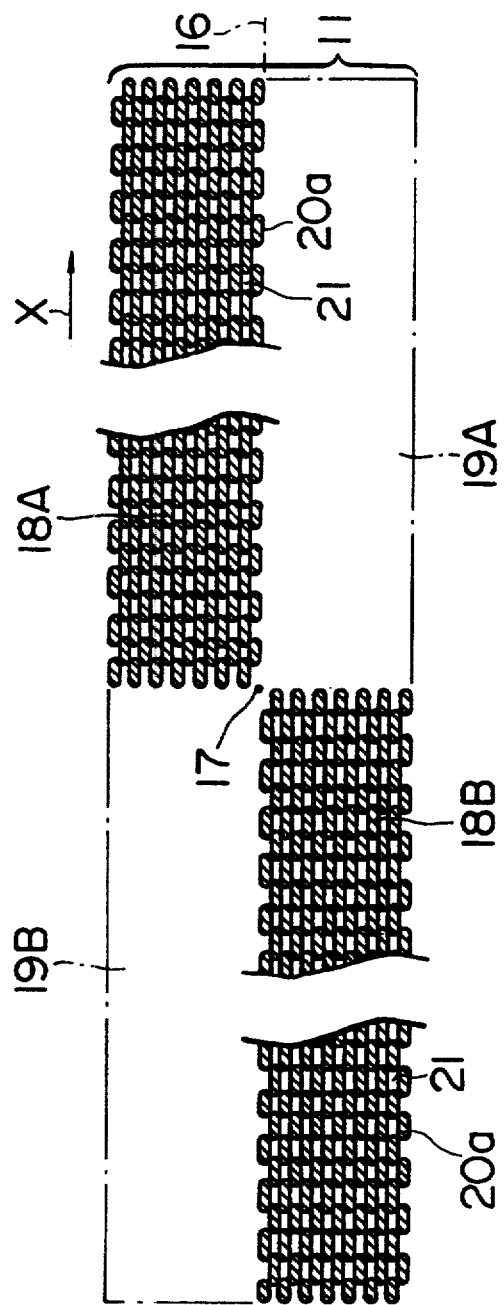
FIG. 15 is an enlarged plan view of another modified reference track.
Figure 16:
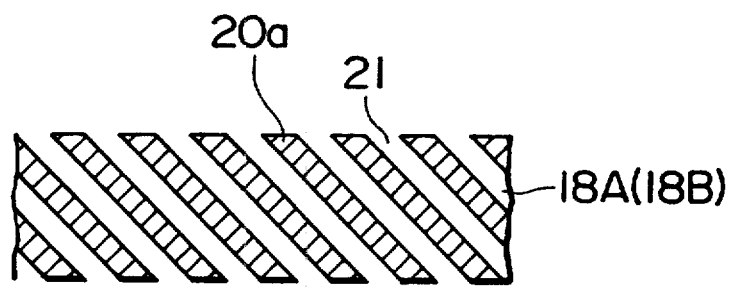
FIG. 16 is an enlarged plan view of a further modified reference track.
Figure 17:
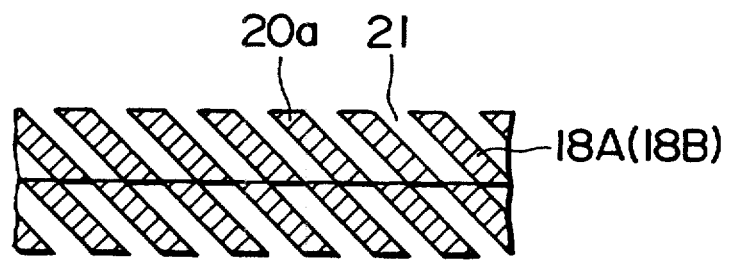
FIG. 17 is an enlarged plan view of a further modified reference track.
Figure 18:
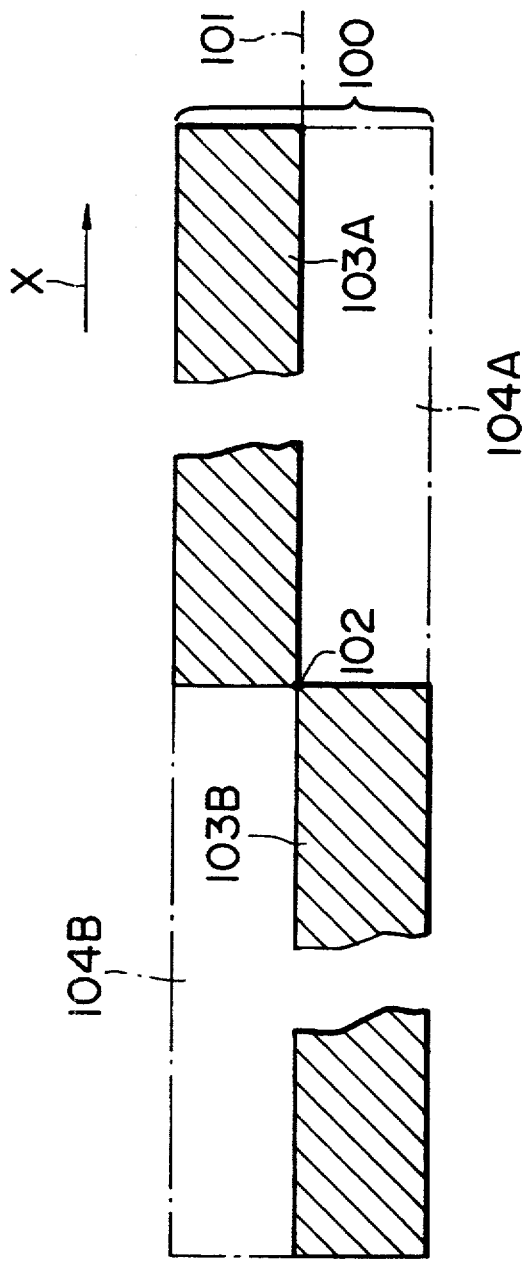
FIG. 18 is an enlarged plan view of a portion of the conventional reference track.
Figure 19:
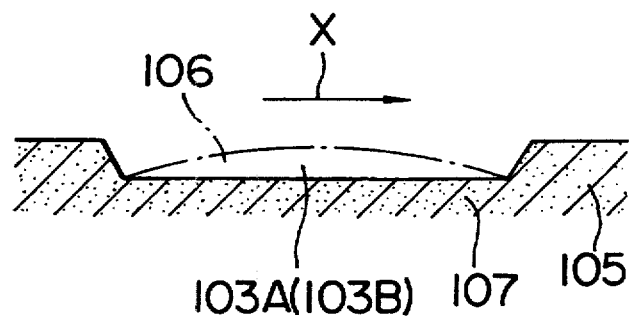
FIG. 19 is an enlarged cross-sectional view of a portion of the conventional reference track.

FIGS. 15 to 17 show modified small recesses 20a and modified small flat portions 21 in reference recess regions 18A and 18B, and various patterns of small recesses 20a and small flat portions 21 can be used.

In the above embodiments, although the reference track has been explained to be provided at the innermost peripheral portion of the recording region, the reference track may be provided at the outermost peripheral portion of the recording region.

In the above embodiments, although the magnetic disk has been described as an example of the magnetic recording medium, the present invention can be applied also to other form of magnetic recording medium, such as a magnetic card.

As described above, in the present invention, the reference recesses are formed by cutting by a laser, and as a result the magnetic powder, the binder and etc., are eliminated from those portions at which the reference recesses are formed. Therefore, in contrast with the prior art, a spring back effect will not occur, and the density of the magnetic filler powder will not become higher at these parts of the reference track, so that the neat recesses are formed.

Therefore, the signal is not recorded on the reference recesses, and the center of the magnetic head can be brought properly to the centerline of the reference track, so that the reliability of the magnetic recording medium can be enhanced.

In the case where the reference recess region 18A (18B) is constituted by a number of small recesses 20a as shown in FIGS. 13 and 15 to 17, the small recesses 20a may be formed by embossing, instead of using the cutting by a laser.

Figure 20:
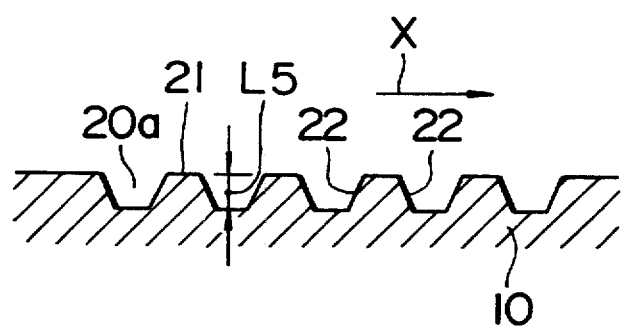
FIG. 20 is an enlarged cross-sectional view of a portion of a reference track.

As shown in FIG. 20, each of the above-mentioned small or fine flat portions 21, formed as a result of forming the small or fine recesses 20a at its opposite sides by embossing, has a trapezoidal cross-sectional shape having inclined surfaces 22 at its opposite sides.

In this embodiment, the length L1 of the reference recess region 18A (18B) in the direction of travel of the magnetic head is 2.4 mm, and the length L2 in its widthwise direction is 18 μm, and the length L3 of the small recess 20a in the direction of travel of the magnetic head is 5 μm, and the length L4 of the small flat portion 21 in the direction of travel of the magnetic head is 5 μm, and the depth L5 (FIG. 20) of the small recess 20a is 0.3 to 0.4 μm.

The length L3 of the small recess 20a in the direction of travel of the magnetic head, as well as the length L4 of the small flat portion 21 in the direction of travel of the magnetic head, can be suitably determined within the range of 1 to 10 μm. The length L3 and the length L4 may be different from each other.

The length and/or depth of each portion mentioned about are/is suitably determined in accordance with the size of the magnetic disk 2, the physical properties of the magnetic layer 10 (particularly, the spring back effect obtained at the time of and after the pressing operation), and the condition of the waveform of the signal recorded on the reference track 11.

The predetermined signal is recorded over the entire area of the reference track 11 (over the combined widths of the reference recess region 18A and the flat portion 19A); however, since the small recesses 20a are depressed, the signal is not recorded on the small recesses, but is recorded mainly on the flat portions 19A and 19B. In accordance with the signal waveform obtained by scanning the reference track 11 by the magnetic head whose (track) width is a half of the track width of the reference track 11, a feedback control is applied to the position of the magnetic head so as to bring the center position of the magnetic head (the magnetic gap) to the centerline 16 of the reference track 11.

In this case, the small recesses 20a of the reference track 11 and the tracking recesses 23 of the magnetic head-tracking optical tracks 12 are both formed simultaneously by embossing or pressing as shown in FIG. 9. Namely, in this case, those projections 29a provided at the innermost peripheral portion of the stamper 28 and each having small or fine projections (not shown in FIG. 9) serve to form the small recesses 20a.

According to the second aspect of the present invention, as described above, the small recesses and the small flat portions are alternately formed on the reference recess region, and therefore even if the recesses are formed by embossing or pressing, the influence by the spring back hardly occurs, so that the neat recesses are formed.

Therefore, the signal is not recorded on the recesses, and the center of the magnetic head can be properly brought to the centerline of the reference track, thereby enhancing the reliability.

Although different from the above-mentioned first and second aspects of the invention, the following method may be used, i.e. a method of producing a magnetic recording medium having a substrate made of a non-magnetic material, and a magnetic layer on the substrate, wherein a reference portion is provided at a predetermined portion of the magnetic layer; a first magnetic head-tracking optical recess is provided at a position spaced a predetermined distance from the reference portion in a direction perpendicular to the direction of travel of a magnetic head; a second magnetic head-tracking optical recess is provided at a position spaced a predetermined distance from the first magnetic head-tracking optical recess in a direction perpendicular to the direction of travel of the magnetic head; a first data track for recording desired information therein is formed between the first and second magnetic head-tracking optical recesses; wherein the reference portion has a pair of reference recess regions arranged symmetrically with respect to an arbitrary point disposed on a centerline of the reference portion, and a flat portion with no recess which flat portion is disposed adjacent to each of the reference recess regions, the production method, comprising forming the recess of the reference recess region, for example, by embossing or pressing, and then magnetizing the reference portion with a DC magnetic field having a strength greater than a magnitude of a coercive force of the magnetic powder of the magnetic layer, for example, by the use of a magnetic head or a permanent magnet.

In this method, since the flat portion is uniformly magnetized by the DC magnetic field to have the same polarity, an abrupt change of the output waveform appears at positions corresponding to end edges of each flat portion adjacent to the associated recesses.

The recesses of the reference portion are formed by pressing or the like, so that a curvingly-bulged portion is formed at a central part of the bottom surface of the recess because of the spring back due to elasticity of the material, and this bulged portion is magnetized by the DC magnetic field. Even in this case, as compared with the output waveform from the curvingly-bulged portion, the abrupt change of the output waveform at the edges of the flat portion is much greater. Therefore, the flat portion (or the recess) of the reference portion can be clearly detected. As a result, the center of the magnetic head can be properly brought to the centerline of the reference track, and the reliability of the magnetic recording medium can be enhanced.

Figure 21:
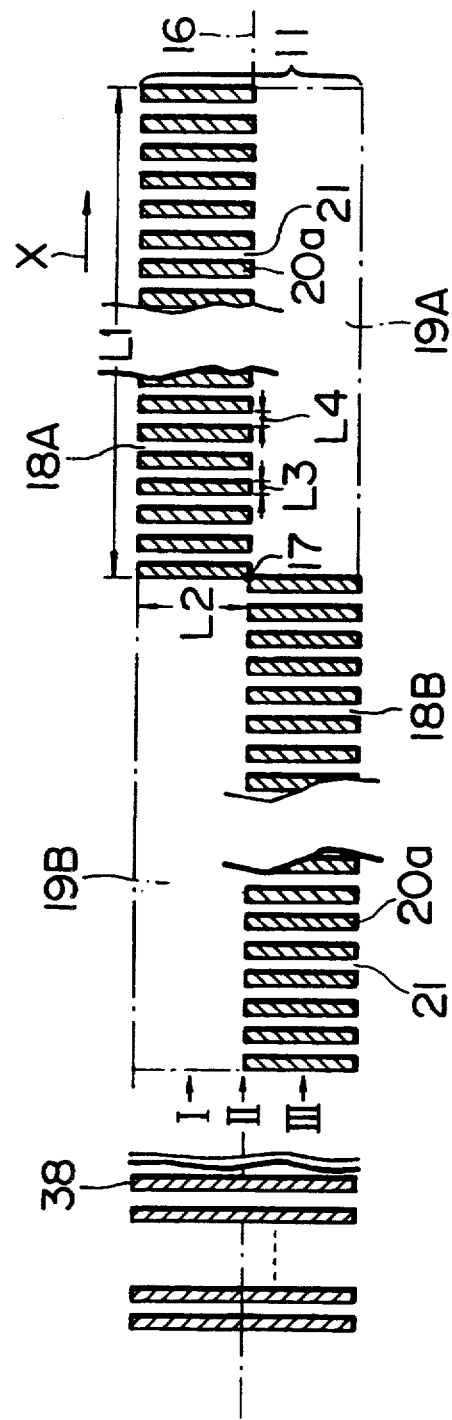
FIG. 21 is an enlarged plan view of a portion of a reference track.

As shown in FIG. 21, a number of small recesses 20a and a number of small flat portions 21 are alternately formed on each of reference recess regions 18A and 18B, and extend in a direction perpendicular to the direction X of travel of the magnetic head. In FIG. 21, reference numeral 38 denotes a start signal recess for providing a start signal for the detection of a reference signal, the start signal recesses 38 being provided before the reference recess regions 18A and 18B and the flat portions 19A and 19B.

Figure 22A:
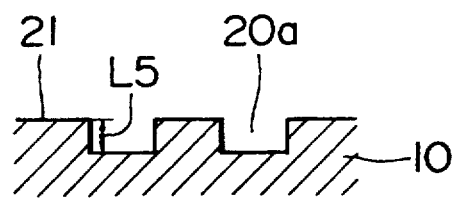
FIG. 22A is an enlarged cross-sectional view of a portion of the reference track.
Figure 22B:
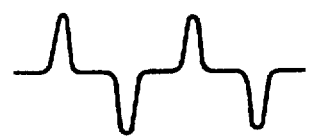
FIG. 22B is a diagram showing an example of a reproduction output waveform.

FIG. 22 is an enlarged cross-sectional view showing the small recesses 20a and the small flat portions 21. FIG. 22B is a diagram showing a part of a waveform of a reproduction output signal corresponding to the reference recess region 18A (18B) after the DC erasing. As shown in this Figure, an extreme waveform change is recognized at the edges of the small flat portion 21 adjacent to the associated small recesses 20a.

Figure 23:
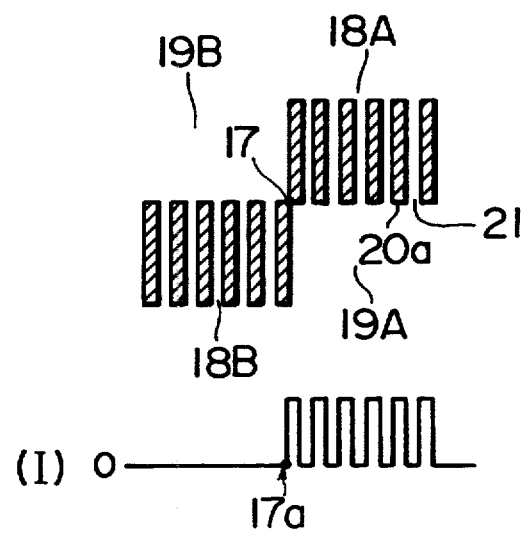
FIG. 23 is a diagrammatic illustration showing the reference track and associated output waveforms of signals to be read from the reference track.
Figure 23:
Figure 23:

Reproduction output waveforms, obtained when the magnetic head (which has a track length slightly smaller than the width L2 of the reference recess region 18A) is scanningly moved at position I, position II and position III in a direction of arrow in FIG. 21, are shown in FIG. 23 which also Shows the reference track 11 on its top. The output waveforms in FIG. 23 are envelope waveforms obtained by integrating the differential waveforms as shown in FIG. 22B.

Diagram (I) of FIG. 23 shows the output waveform obtained when the magnetic head is scanningly moved at the position I (FIG. 21) from the flat portion 19B over the reference recess region 18A. This shows that the magnetic head passes past the boundary between the flat portion 19B and the reference recess region 18A when the discontinuous waveform appears at a point 17a.

Diagram (II) of FIG. 23 shows the output waveform obtained when the magnetic head is scanningly moved at the position II (FIG. 21), that is, over the centerline 16 of the reference track 11. This waveform is in the shape of continuous teeth.

Diagram (III) of FIG. 23 shows the output waveform obtained when the magnetic head is scanningly moved at the position III (FIG. 21) from the reference recess region 18B over the flat portion 19A. This shows that the magnetic head passes past the boundary between the reference recess region 18B and the flat portion 19A when the discontinuous waveform disappears at a point 17b.

Thus, when the position of the magnetic head in the widthwise direction of the reference track 11 changes, the shape of the waveform obtained is greatly varied, and by adjusting the position of the magnetic head so that the output waveform as in the diagram (II) of FIG. 23 can be obtained, the center position of the magnetic head (the magnetic gap) can be brought to the centerline 16 of the reference track 11.

The DC erasing is effected by the magnetic head over the entire area of the reference track 11 (over the combined widths of the reference recess region 18A and the flat portion 19A).

When barium ferrite is used as the magnetic material as described in the above Example 2 of magnetic coating composition, the reference track 11 is erased over the entire area thereof by the DC magnetic field of 1,000 to 3,000 Oe in this embodiment, since the coercive force (Hc) of the barium ferrite is 530 Oe. By this erasing, the flat portions 19A and 19B are uniformly magnetized to have the same polarity.

The DC magnetic field is at least twice larger (preferably 4 to 10 times larger) than the coercive force (Hc) of the magnetic layer.

Figure 24:
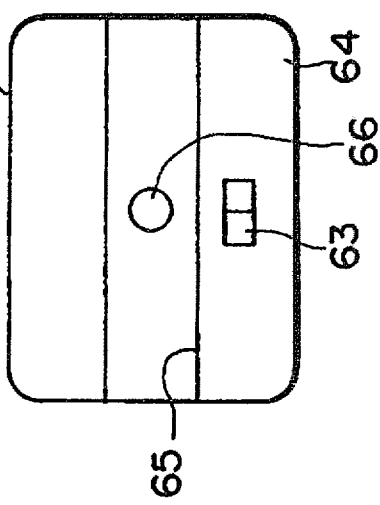
FIG. 24 is a bottom view of a magnetic head.

As shown in FIG. 24, the magnetic head 30a comprises a magnetic core 63 made of a magnetic material such as a Mo—Ni—Fe alloy, an Al—Si—Fe alloy, a Ni—Zn ferrite or an amorphous alloy, and a slider 64, of a non-magnetic material such as barium titanate, holding the magnetic core 63. An air-escape groove 65 is formed in the lower surface of the slider 64 facing the magnetic disk, and an opening is formed at a generally central portion of this groove 65.

FIG. 22B shows, as described before, the output waveform reproduced by the magnetic head after the DC erasing is effected by the magnetic head 30a over the entire area of the reference track 11.

As shown in FIG. 22B, an abrupt change of the output waveform is recognized at the edges of the small flat portion 21 adjacent to the associated small recesses 20a, and therefore the small recess 20a can be positively detected.

Figure 25:
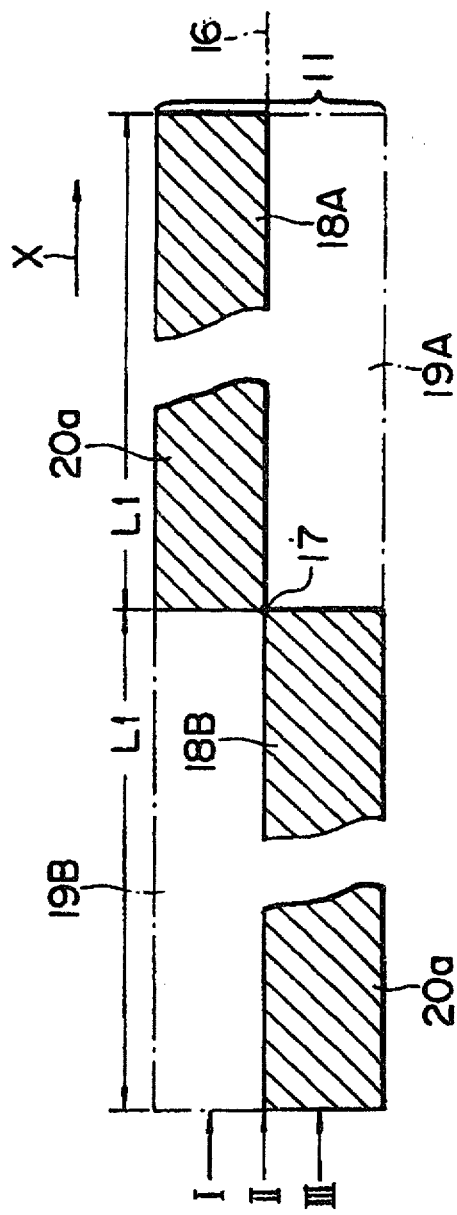
FIG. 25 is an enlarged plan view of a modified reference track.
Figure 26A:
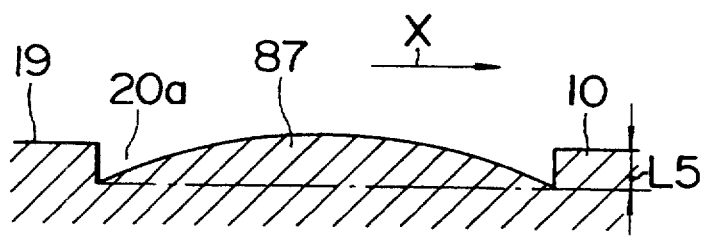
FIG. 26A is an enlarged cross-sectional view of a portion of the reference track.

FIG. 25 shows an example of reference track 11. In this example, a recess 20a is formed by embossing or pressing in each of reference recess regions 18A and 18B over the entire area thereof, as is the case with the prior art. FIG. 26A shows the cross-sectional shape of this recess 20a. Since the recess 20a is formed by pressing, a curvingly-bulged portion 87 is formed generally at the central portion of the recess 20a because of the spring back, as shown in FIG. 26A.

Figure 26B:
FIG. 26B is a diagram showing a reproduction output waveform.

Even if the bulged portion 87 is also magnetized by a DC magnetic field, the change of the output waveform is gentle since the curved surface is gentle, as shown in FIG. 26B, and as compared with the change of the waveform at the curvingly-bulged portion 87, the abrupt change of the waveform at the edge portion of the flat portion 19 is far greater, and this can be clearly distinguished. Therefore, the flat portion 19 (or the recess 20a) can be clearly detected.

Figure 27:
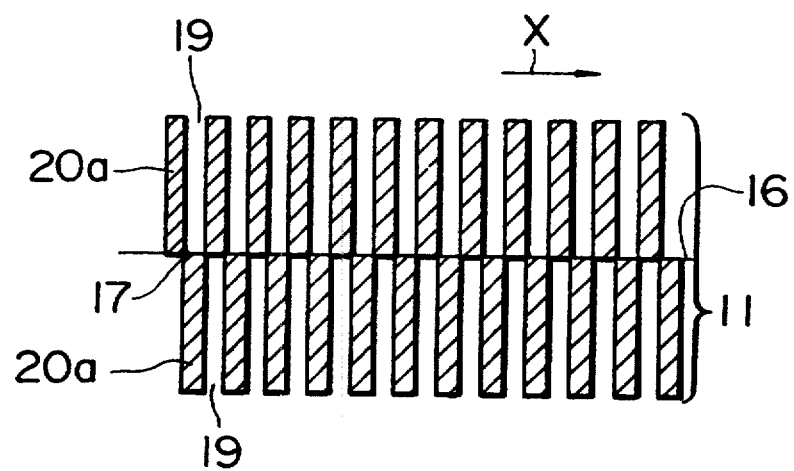
FIG. 27 is an enlarged plan view of a still further modified reference track.

FIG. 27 shows modified reference track 11. In this example, a number of small recesses 20a and a number of relatively small flat portions 19 are alternately formed along the direction X of travel of the magnetic head.

In FIG. 27, although the lower ends of the upper small recesses 20a are disposed immediately adjacent to the upper ends of the lower small recesses 20a, the lower ends of the upper small recesses 20a may be spaced a predetermined distance from the upper ends of the lower small recesses 20a, respectively.

As described above, in the case additionally described with reference to FIGS. 21 to 27, the flat portions are uniformly magnetized by the DC magnetic field to have the same pole, and, by doing so, an abrupt change of the waveform appears at each of the end edges of the flat portion, that is, the edges of the flat portion disposed adjacent to the associated recesses.

By utilizing this, the center of the magnetic head can be brought properly to the centerline of the reference track, and as a result the reliability of the magnetic recording medium is enhanced.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium comprising a substrate made of a non-magnetic material, and a magnetic layer comprising magnetic powder in a binder on said substrate, wherein said magnetic layer comprises a reference portion at a predetermined position thereof;

a first magnetic head-tracking optical recess at a position spaced a predetermined distance from said reference portion in a direction perpendicular to a direction of travel of a magnetic head relative thereto;

a second magnetic head-tracking optical recess at a position spaced a predetermined distance from said first magnetic head-tracking optical recess in a direction perpendicular to the direction of travel of the magnetic head; and a first data track for recording therein desired information between said first and second magnetic head-tracking optical recesses, wherein said reference portion has (1) a pair of reference recess regions arranged symmetrically with respect to an arbitrary point on a centerline of said reference portion, each of said reference recess regions comprising a recess with an underlying portion of said magnetic layer having the same magnetic powder density as the remaining portion of the said magnetic layer formed by cutting by a laser, and (2) a constant depth flat portion with no recess which flat portion is disposed adjacent to each of said reference recess regions so that undesirable signals are not recorded in the reference recess regions.

2. A magnetic recording medium according to claim 1, in which said magnetic recording medium is a magnetic disk.

3. A magnetic recording medium according to claim 2, in which a plurality of said magnetic head-tracking optical recesses are provided in concentric relation.

4. A magnetic recording medium according to claim 2, in which said reference portion is situated at an inner peripheral portion of said magnetic disk in concentric relation to said magnetic head-tracking optical recesses.

5. A magnetic recording medium according to claim 2, in which said magnetic disk is rotatably housed in a case to provide a magnetic disk cartridge.

6. A magnetic recording medium according to claim 5, in which said magnetic disk of said magnetic disk cartridge has a center hub mounted on a central portion of said magnetic disk.

7. A magnetic recording medium according to claim 1, in which said magnetic powder comprises barium ferrite.

8. A magnetic recording medium comprising a substrate made of a non-magnetic material, and a magnetic layer comprising magnetic powder in a binder on said substrate, wherein said magnetic layer comprises a reference portion at a predetermined position thereof;

a first magnetic head-tracking optical recess at a position spaced a predetermined distance from said reference portion in a direction perpendicular to a direction of travel of a magnetic head relative thereto;

a second magnetic head-tracking optical recess at a position spaced a predetermined distance from said first magnetic head-tracking optical recess in a direction perpendicular to the direction of travel of the magnetic head; and a first data track for recording therein desired information between said first and second magnetic head-tracking optical recesses, wherein said reference portion has at least one pair of reference recess regions arranged symmetrically with respect to an arbitrary point on a centerline of said reference portion, each of said reference recess regions comprising a plurality of small recesses and small constant depth flat portions alternately configured, said small recesses including an underlying portion of said magnetic layer having the same magnetic powder density as the remaining portion of the said magnetic layer formed by a laser, and a constant depth flat portion with no recess which flat portion is disposed adjacent to each of said reference recess regions, so that undesirable signals are not recorded in the reference recess regions.

9. A magnetic recording medium according to claim 8, in which said magnetic recording medium is a magnetic disk.

10. A magnetic recording medium according to claim 9, in which a number of said magnetic head-tracking optical recesses are provided in concentric relation.

11. A magnetic recording medium according to claim 9, in which said reference portion is situated at an inner peripheral portion of said magnetic disk in concentric relation to said magnetic head-tracking optical recesses.

12. A magnetic recording medium according to claim 10, in which said magnetic disk is rotatably housed in a case to provide a magnetic disk cartridge.

13. A magnetic recording medium according to claim 12, in which said magnetic disk of said magnetic disk cartridge has a center hub mounted on a central portion of said magnetic disk.

14. A magnetic recording medium according to claim 8, in which said magnetic powder is made of barium ferrite.

* * * * *